United States Patent [19]
Pickard

[11] 3,855,825
[45] Dec. 24, 1974

[54] BICYCLE LOCK
[75] Inventor: Frank W. Pickard, Inglewood, Calif.
[73] Assignee: Eleanor D. J. Stanford, Los Angeles, Calif. ; a part interest
[22] Filed: Mar. 5, 1973
[21] Appl. No.: 338,065

[52] U.S. Cl. .................................... 70/14, 70/226
[51] Int. Cl. ........................................... E05b 73/00
[58] Field of Search ............... 70/14, 15, 16, 17, 18, 70/19, 23, 32, 33, 34, 181, 225, 226, 227, 233, 236; 292/267, 305

[56] References Cited
UNITED STATES PATENTS
563,991  7/1896  Thomas .............................. 70/226

| | | | |
|---|---|---|---|
| 1,339,075 | 5/1920 | Toelle | 70/232 |
| 1,453,139 | 4/1923 | Huston | 70/34 X |
| 2,999,377 | 9/1961 | Raye | 70/32 |

FOREIGN PATENTS OR APPLICATIONS
877,545  9/1942  France .................................. 70/14
867,676  8/1941  France .................................. 70/227

Primary Examiner—Robert L. Wolfe
Attorney, Agent, or Firm—Harris, Kern, Wallen & Tinsley

[57] ABSTRACT

A portable lock having a pair of jaws for gripping spoked wheel rims and tubular frame members of bicycles and the like, releasable only upon rotation of a jaw connecting shaft.

3 Claims, 5 Drawing Figures

PATENTED DEC 24 1974　　　　　　　　　　　　　　　　3,855,825
FIG.1.
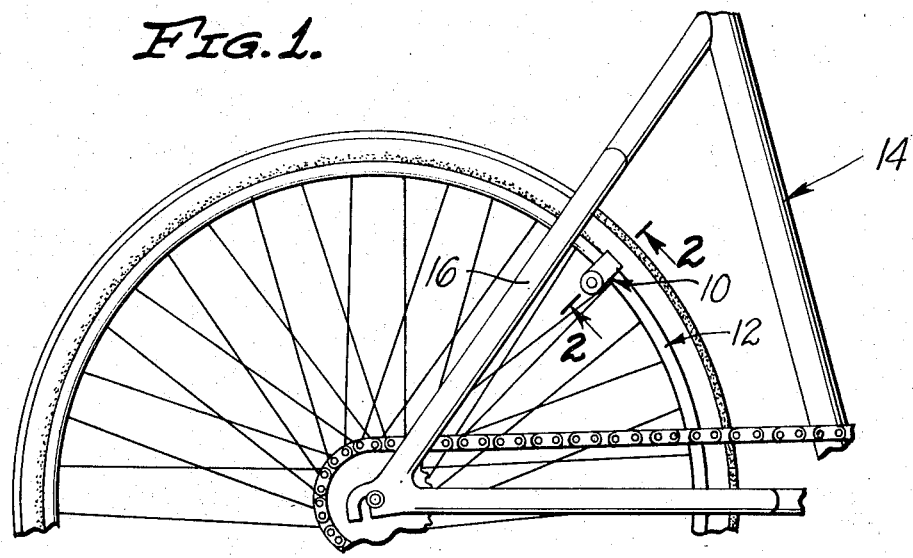
FIG.2.
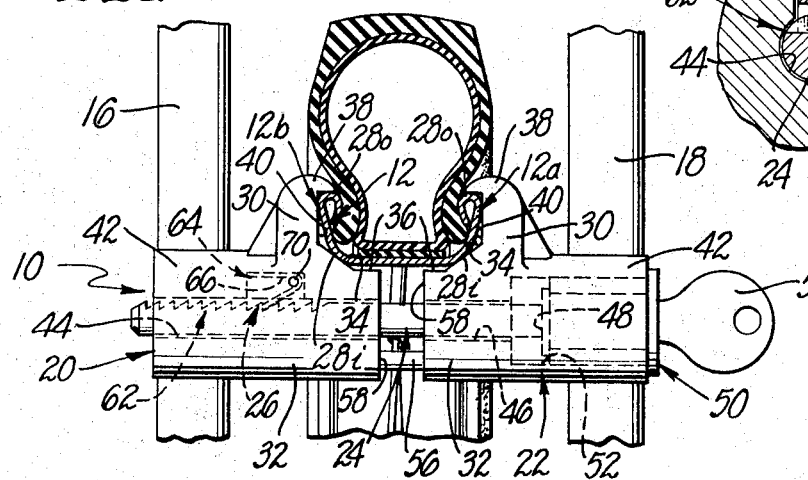
FIG.5.
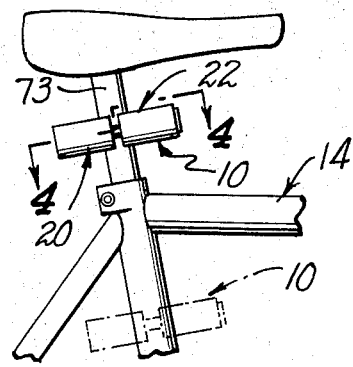
FIG.4.
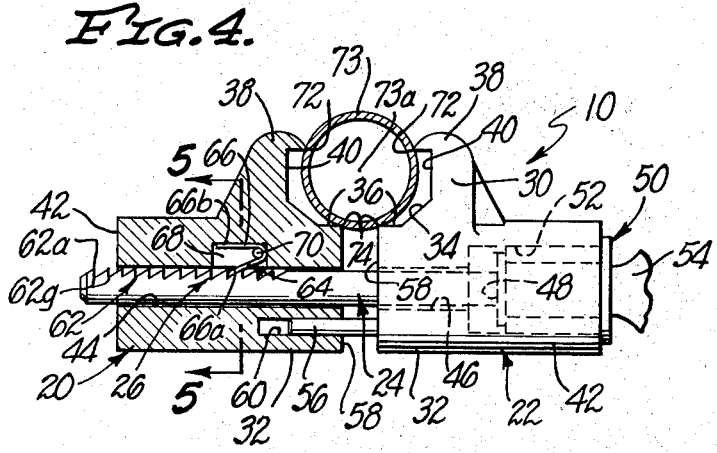
FIG.3.

BICYCLE LOCK

DISCLOSURE

The present invention relates to theft prevention devices and, more particularly, to a wheel-type locking device for bicycles and other spoked wheeled vehicles.

In general, bicycle locks on the market today are either of a tether or wheel-lock type. The present invention is directed to the wheel-lock type.

Presently, wheel locks for bicycles fall in one of two categories; those comprising a flexible member, such as a cable or a chain, with ends joined together by a lock mechanism to form a continuous loop, or those comprising a rigid U-shaped bar with a lock mechanism spanning the open end thereof to form a continuous loop.

Wheel locks utilizing a flexible member can be installed by first leading a free end of the flexible member between and around one or more wheel spokes and one or more frame member elements and then locking the ends of the flexible member together. For example, the flexible member may encircle the tire and wheel rim and one or more frame members or one or both arms of a forked axle support and a plurality of spokes in the vicinity of the hub of the wheel. The exact path followed by the flexible member during installation is variable and dependent to a great extent upon the installation time available and the length of the flexible member.

Wheel locks utilizing a rigid U-shaped bar may be installed by passing one leg of the bar between adjacent spokes and a closed end of the bar around a frame member, the lock mechanism and opposite leg completing encirclement of the spokes and frame member. Where the spacing of the legs of the U-shaped bar permits, the wheel rim and tire may be included in the encirclement either with or without the inclusion of a spoke.

In practice, present day wheel locks as described above have been found to possess several annoying disadvantages. For example, wheel locks comprising a flexible member take a relatively long time to install and disconnect. Further, the wrapping of the flexible member around and around wheel spokes and bicycle frame members is an annoying operation as is the unwrapping operation when it is desired to disconnect such locks.

Usually, the flexible members included in wheel locks are covered by a plastic sleeve to reduce the chances of marring or otherwise damaging the spokes and frames to which they are attached. The same is not true, however, of wheel locks including rigid U-shaped bars. Such locks are in direct contact with spokes and frame members and any relative movement between lock and bicycle is likely to result in marring of painted surfaces and bending of spokes. Such often occurs when locked bicycles are unintentionally or intentionally knocked over or otherwise tampered with. Further, the locking operation for wheel locks as aforesaid takes an appreciable amount of time and requires the exercise of care in training the U-shaped bar through and around spokes and supporting frame members.

Similar problems are attendant to the storage of such locks when not in use. Usually such locks are stored in a locked condition on the bicycle with the flexible member or U-shaped bar encircling the support post or springs of a bicycle seat. Sometimes a junction of the handlebars and the supporting gooseneck is used as structure for attachment of the lock. Depending on the bicycle, an auxiliary parcel rack or some other bicycle accessory also may be used to support the lock when not in use. A common disadvantage of the foregoing storage means is the looseness of the attachment of the lock to the bicycle with the attendant inability to firmly restrain from motion all elements of the lock. This leads to the annoying rattles and shifting of position of the lock when the bicycle is moved or ridden and to damage to paint and other surface finishes to which the lock is secured.

In view of the foregoing problems it is an object of the present invention to provide a direct acting lock which may be easily and quickly applied to and released from the spoked wheel of a bicycle or the like and which is adapted for rattle-free storage when attached to structural or accessory supporting elements of the bicycle.

Another object of the present invention is to provide a lock of the foregoing character which will accommodate a range of wheel rim styles and sizes.

A further object of the present invention is to provide a bicycle lock of the foregoing character including a pair of jaws for releasably gripping opposite sides of a wheel rim and for engaging the wheel supporting fork of the bicycle to limit rotation of the wheel.

Still another object of the present invention is to provide a bicycle lock of the foregoing character wherein the jaws are locked by a connecting shaft turnable relative to the jaws to quickly release the jaws for axial movement on the shaft.

The foregoing as well as other objects and features of the present invention may be more clearly understood by reference to the following detailed description when considered with the drawing which illustrates, by way of example only, a preferred form of bicycle lock embodying the features of the present invention.

In the drawing:

FIG. 1 is a partial side view of the rear wheel and supporting structural frame members of a bicycle showing the quick-release lock of the present invention in its locked position on the innermost periphery of the wheel rim;

FIG. 2 is a sectional view taken along the line 2—2 of FIG. 1 showing the wheel supporting frame members relative to the quick-release bicycle lock in its locked position;

FIG. 3 is a partial side view of the seat supporting post and adjacent frame members of a bicycle showing in solid and phantom outline the manner in which the quick-release bicycle lock may be locked in rattle-free storage positions on the bicycle;

FIG. 4 is a sectional view taken along the line 4—4 of FIG. 3 showing the internal structure of a releasable locking mechanism of the lock; and FIG. 5 is a fragmentary sectional view taken along the line 5—5 of FIG. 4, slightly enlarged and showing the cavity and ratchet of the releasable locking mechanism.

In brief, the lock 10 of the present invention is designed to quickly and tightly clamp onto the spoked wheel rim 12 of a bicycle 14 and to limit rotation of the wheel by engaging wheel supporting fork members 16 and 18 of the bicycle frame. To accomplish this, the illustrated form of the lock basically comprises a pair of jaws 20 and 22 supported on a turnable connecting shaft 24. The jaw 20 is axially movable on the shaft toward the jaw 21 to tightly grip between the jaws opposite sides 12a and 12b of the wheel rim 12. Thus positioned, the jaws are adapted to engage the fork members 16 and 18 and to thereby limit rotation of the bicycle wheel. Further, as the jaw 20 is moved axially toward jaw 22, cooperative means 26 on the shaft and movable jaw is actuated to releasably lock the jaws against axial separation. A turning of the shaft 24, however, simply and quickly releases the cooperative means 26 permitting separation of the jaws and release the lock from the wheel rim. Accordingly, the lock of the present invention is easily and effectively applied to and released from spoked bicycle wheels and the like and may be similarly clamped to other structural support members of the bicycle for convenient rattle-free storage when not in use.

Referring now more specifically to the preferred form of the invention illustrated in the drawing, the jaws 20 and 22 are of similar construction and are designed to capture and wedge tightly against the opposite sides 12a and 12b of the rim 12. In that respect, and as shown most clearly in FIG. 2, the rim 12 is generally U-shaped in cross section including annular outermost and innermost peripheral edges 28o and 28i on opposite sides thereof, and the jaws are designed to grip the outermost edges and wedge against the innermost edges. To accomplish this, the jaws 20 and 22 include upward projections 30 from main body portions 32 of the jaws. The projections 30 include opposing upwardly and outwardly sloping surfaces 34 extending from generally horizontal top surfaces 36 of the main body positions, and inwardly directed substantially horizontal opposing lips 38 connected to the sloping surfaces by vertical surfaces 40. As represented in FIGS. 1 and 2, the lips engage the opposite outermost peripheral edges 28o while the opposing sloping surfaces 34 engage the opposite innermost peripheral edges 28i to exert wedging forces on the rim 12 as the jaws 20 and 22 are moved axially toward each other on the connecting shaft 24 in a direction of an axle of the wheel. Such a connection of the lock to the wheel is tight and rattle-free, yet not deforming of the wheel rim 12. Also, as indicated in FIG. 2, with the lock 10 secured to the rim 12, rotation of the wheel is limited and rolling motion of the bicycle restricted by horizontal extensions 42 from the main body portions 32 engaging the wheel supporting fork members 16 and 18.

As previously stated, the connecting shaft 24 supports the jaws 20 and 22 for relative movement toward each other and the rim 12. Preferably, the connecting shaft 24 is of circular cross section and of a length which will accommodate the jaws 20 and 22 both in their locked as well as in a separated condition. Further, the shaft is of sufficient diameter and rigidity to resist deflection in response to bending moments imposed by the jaws 20 and 22 when in the aforesaid locked position. Such bending moments are developed by the nature of the impingement of the innermost peripheral edge 28i of the wheel rim 12 and sloping surfaces 34.

To accommodate the connecting shaft 24, coaxial passageways 44 and 46 are formed in the jaws 20 and 22 respectively. The connecting shaft is positioned and rotatable in the coaxial passageways. In addition, sufficient clearance is provided in passageway 44 to accommodate relative axial movement between the jaw 20 and the connecting shaft 24 of the jaw 20 thus defining a movable jaw.

While the shaft 24 is rotatable in the passageway 46, relative axial movement between the shaft and the jaw 22 is restricted, the jaw 22 thus defining an axially fixed jaw. Various means may be included for restricting relative axial movement of the jaw 22. Accordingly, it is by way of example only that such restriction is here provided by an axial securing of an end of the connecting shaft to a turnable portion 48 of a lock 50. As shown in FIGS. 2 and 4, the lock 50 is secured in a coaxial cavity 52 in an outer end of the horizontal extension 34 of the jaw 22. Again various forms of locks may be included in the jaw 22 to limit axial movement of and provide means for selectively returning the shaft 24. Accordingly, it is by way of example only that the lock 50 is illustrated as being of a key type with the turnable portion 48 and hence the shaft 24 being turned in response to a turning of a key 54. In this respect, the lock 50 is of a conventional design.

During locking and unlocking of the jaws 20 and 22 against the rim 12, it is important that the jaws be aligned. Of course, the shaft 24 provides a degree of alignment of the jaws. However, because of the rotatable nature of the jaws relative to the connecting shaft, it is desirable in a preferred form of the invention to provide additional guiding means for limiting relative movement of the jaws to axial movement on the shaft. Such limiting means are here illustrated as comprising a guide pin 56 immovably fastened to an inner end 58 of the jaw 22 and extending substantially parallel to the shaft 24 into a coaxial opening 60 in the end surface 58 of the jaw 20. When the guide pin 56 is located in the opening 60, the jaws 20 and 22 are aligned and are prevented from turning relative to each other on the shaft 24. Relative movement between jaws is limited to axial movement toward and away from each other on the shaft 24.

While the jaws 20 and 22 are movable toward and away from each other on the connecting shaft 24, the cooperative means 26 is designed to (a) releasably lock the jaws against axial separation when the shaft is in a normal or first rotational position and (b) to release the jaws and permit axial separation when the shaft is turned from the normal rotational position. From the foregoing description concerning the lock 50, it is of course understood that the rotational position of the shaft 24 relative to the jaws 20 and 22 is controllable in the illustrated form of the invention by the rotation or turning of the key 54. In connection with this, the cooperative means 26 may take various forms. For example, in the illustrated form of the invention and as most clearly shown in FIG. 4, the cooperative means 26 comprises a one-way ratchet including a row of uniform teeth 62 and a latching pawl 64.

In the orientation shown in FIGS. 2 and 4, the teeth 62 are formed in a top side of the connecting shaft 24 and extend in a row from an end of the shaft remote from the lock. Each tooth includes an inclined face rising from left to right, and a vertical face intersecting the inclined faces of adjacent teeth at an apex 62a and at a gullet 62g thereof. As represented in FIG. 5, each gullet is generally perpendicular to the axis of the connecting shaft.

The latching pawl 64 preferably comprises a V-shaped spring member 66 held in a cavity 68 by a retaining pin 70. The cavity 68 is formed in the movable jaw 20 and opens into a top of the passageway 44. The spring member 66 is positioned in the cavity 68 with an open end of the V directed to the left or toward the extension 34 from the jaw 20. Thus positioned, one arm 66a of the V-shaped spring member protrudes into the passageway 44 along a direction substantially parallel to the inclined faces of the teeth 62. The other arm 66b of the spring member bears against a base of the cavity 68. The pin 70 retains the spring member 66 in the indicated position by passing through the jaw 20 and cavity 68 into engagement with a closed end of the V-shaped spring member.

Thus positioned, as the shaft 24 is inserted into the passageway 44 or as the jaw 20 is moved to the right along the shaft, the arm 66a deflects slightly and rides over successive inclined faces of the teeth 62 to accommodate such axial movement of the jaw. However, movement in an opposite direction to produce an axial separation of the jaws 20 and 22 is prevented by the end of the arm 66a engaging a vertical face of one of the teeth at a gullet 62g as indicated. The cooperative means 26 thus locks the jaws against axial separation.

Before the jaws can be separated, as when it is desired to release the lock 10 from the rim 12, the shaft 24 must be rotated from its normal position as by a turning of the key 54. As this occurs, the arm 66a riding along a gullet 62g defelects upwardly to accommodate a turning of the shaft and a release of the spring member 66 from the teeth 62. In the turned position, the shaft 24 and the jaw 22 may be moved axially away from the jaw 20 to effect a release of the lock 10 from rim 12.

From the foregoing description, it is appreciated that the lock 10 may be quickly secured to the rim 12 simply by momentarily turning the shaft 24 from its normal rotational position and separating the jaws 20 and 22, then positioning the jaws on opposite sides of the rim and moving the jaw 20 toward the jaw 22 on the connecting shaft until the positioning shown in FIG. 2 is achieved. The connection is tight and rattle-free. Likewise, it is a simple matter to quickly release the lock 10 from the rim 12 by turning the shaft 24 from its normal rotational position and moving the shaft and jaw 22 away from the jaw 20.

As indicated, the connection of the lock 20 on the rim 12 is tight and rattle-free. The same is true of the connection of the lock 10 to a seat post or other bicycle frame member when the lock is not in use. Such positioning of the lock is illustrated in FIGS. 3 and 4. As shown, to provide such rattle-free storage, the lips 38 include substantially straight inwardly facing edges 72 for tightly engaging opposite sides of a support member (here a seat post 73) on one side of a longitudinal axis 73a thereof. The jaws further include inward corners or projections 74 defined by intersections of the inner surface 58 and the flat top surfaces 36. The corners 74 engage opposite sides of the seat post on an opposite side of the longitudinal axis 73a. The edges 72 of the lips and the corners 74 make line contacts with the post 73 substantially parallel to the axis 73a and releasably secure the lock 10 to the post in a stable, rattle-free condition when the lock is not in use on the rim 12.

From the foregoing detailed description, it is to be understood that the rattle-free, quick-release bicycle lock of the present invention is a simple, effective, and dependable structure for protecting bicycles and the like from theft and unauthorized usage by preventing complete rotation from one of its wheels. The lock of the present invention can be easily attached to a spoked wheel rim for such purpose or similarly attached to vehicle frame or accessory members for storage while the vehicle is in transit. The release of the present invention from its locked-in-place position is easily accomplished by insertion of a unique key and thereby enabling the immediate release of the gripping jaws and removal of the invention.

While a particular form of spoked wheel lock is described in some detail herein, it is appreciated that changes and modifications may be made in the illustrated form without departing from the principal spirit of the invention. Accordingly, it is intended that the invention be limited in scope only by the terms of the following claims.

I claim:

1. A rattle-free, quick-release bicycle lock, comprising:

a pair of jaws for gripping opposite sides of a rim of a spoked wheel in a direction generally parallel to an axial of said wheel, at least one of said jaws supporting a projection for engaging a fork-like frame member supporting the said axle when said jaws are affixed in place on said rim to limit rotation of said wheel, said jaws including coaxial openings;

a connecting shaft turnable in said coaxial openings in said jaws, axially fixed relative to a fixed one of said jaws, and axially slidable in the opening in a movable one of said jaws; and cooperative means including one-way ratchet means on said movable jaw and connecting shaft for releasably locking said movable jaw against axial movement on said shaft away from said fixed jaw when said shaft is in a preselected rotational position relative to said movable jaw.

2. The lock of claim 1 wherein said cooperative means comprises:

a latching pawl extending into said opening in said movable jaw; and a row of teeth formed on one side of said connecting shaft for successively engaging said latching pawl with axial movement of said movable jaw toward said other jaw and for locking against axial movement of said movable jaw away from said other jaw.

3. The lock of claim 2 wherein:

said movable jaw includes a cavity extending from said opening therein for receiving said latching pawl; and said latching pawl is secured in said cavity and includes a generally V-shaped spring member having one arm secured in said cavity and another arm extending from said cavity into said opening in said movable jaw in a direction away from said other jaw such that an end of said other arm successively engages and rides over said teeth with axial movement of said movable jaw along said connecting shaft toward said other jaw.

* * * * *

PO-1050
(5/69)

UNITED STATES PATENT OFFICE
CERTIFICATE OF CORRECTION

Patent No. 3,855,825      Dated December 24, 1974

Inventor(s) Frank W. Pickard

It is certified that error appears in the above-identified patent and that said Letters Patent are hereby corrected as shown below:

The information regarding the assignee of the above should read:
[73] Assignee: Eleanor D. J. Stanford, Inglewood, Calif.; a part interest Signed and sealed this 13th day of May 1975.

(SEAL)
Attest:

RUTH C. MASON
Attesting Officer

C. MARSHALL DANN
Commissioner of Patents
and Trademarks